US005516060A

United States Patent [19]
McDonnell

[11] Patent Number: 5,516,060
[45] Date of Patent: May 14, 1996

[54] VERTICAL TAKE OFF AND LANDING AND HORIZONTAL FLIGHT AIRCRAFT

[76] Inventor: William R. McDonnell, 54 Roan La., St. Louis, Mo. 63124

[21] Appl. No.: 38,119

[22] Filed: Mar. 29, 1993

[51] Int. Cl.[6] .............................. B64C 27/22; B64C 21/04
[52] U.S. Cl. ........................ 244/7:13; 244/23 B; 244/72; 244/207
[58] Field of Search ................. 244/7 A, 7 B, 244/7 C, 7 R, 23 B, 23 D, 72, 207

[56] References Cited

U.S. PATENT DOCUMENTS

| | | |
|---|---|---|
| 1,870,342 | 8/1932 | Munk . |
| 2,043,704 | 6/1936 | McPherren ............................ 244/19 |
| 2,084,464 | 6/1937 | Stalker ................................ 244/207 |
| 2,328,786 | 9/1943 | Crowder .................................. 244/7 |
| 2,382,460 | 8/1945 | Young ................................... 244/7 B |
| 2,387,762 | 10/1945 | Leonard .................................. 244/7 |
| 2,396,130 | 3/1946 | Sbrilli .................................. 244/17 |
| 2,444,781 | 7/1948 | Leonard .................................. 244/7 |
| 2,479,125 | 8/1949 | Leonard .................................. 244/7 |
| 2,653,779 | 9/1953 | Terry .................................... 244/7 |
| 2,831,543 | 4/1958 | Matthews ........................... 170/135.4 |
| 2,866,608 | 12/1958 | Leonard .................................. 244/7 |
| 3,007,309 | 11/1961 | Meyer ................................ 60/39.35 |
| 3,116,040 | 12/1963 | Petrides et al. ........................ 244/7 B |
| 3,142,455 | 7/1964 | Wilford ................................... 244/7 |
| 3,884,431 | 5/1975 | Burrell .................................. 244/7 A |

FOREIGN PATENT DOCUMENTS

1292006  4/1969  Germany ............................... 244/207

Primary Examiner—Andres Kashnikow
Assistant Examiner—Virna Lissi Mojica

[57] ABSTRACT

The present invention pertains to an aircraft that is capable of converting between vertical flight or helicopter mode flight, and horizontal flight or airplane mode flight where a two-bladed rotor is employed as both helicopter rotor blades in vertical flight and as a fixed wing in horizontal flight. In vertical flight, a bearing connection between two fuselage sections enables a forward section supporting the rotor blades to rotate relative to an aft section of the aircraft fuselage about the longitudinal axis of the aircraft. The exhaust or thrust force created by the mode of power (either a propeller engine or a turbine jet engine) is partially routed over the exterior of the aircraft to provide both vertical and horizontal thrust force, and in one embodiment a portion of the exhaust is routed through the interiors of the rotor blades and out exhaust ports at the blades' distal ends to rotate the blades in vertical flight and to provide a thrust force for the blades in horizontal flight. A control system controls the pitch position of the rotor blades to convert from vertical flight to horizontal flight by rotating the blades about their common lateral axis through opposite angles of substantially 90°.

12 Claims, 3 Drawing Sheets

VERTICAL TAKE OFF AND LANDING AND HORIZONTAL FLIGHT AIRCRAFT

BACKGROUND OF THE INVENTION (1) Field of the Invention

The present invention pertains to an aircraft that is capable of converting between vertical flight or helicopter mode flight, and horizontal flight or airplane mode flight where a two-bladed rotor is employed as both helicopter rotor blades in vertical flight and as a fixed wing in horizontal flight.

(2) Description of the Related Art

Various different types of prior art aircraft have been developed that are capable of taking off vertically in helicopter mode flight with the fuselage oriented vertically and then convert to horizontal flight in airplane mode with the fuselage oriented horizontally. However, a common disadvantage encountered in these prior art aircraft is the instability in flight experienced in the transition from vertical flight to horizontal flight.

The present invention seeks to overcome the disadvantages associated with prior art vertical take off and horizontal flight aircraft by providing a simplified, lightweight aircraft capable of vertical take off with near the efficiency of a helicopter and horizontal flight with near the efficiency of an airplane, while utilizing a minimum number of component parts and reducing the number of moving parts. The aircraft of the present invention provides a simpler, lighter, more efficient and less expensive approach to aircraft capable of both vertical take off and landings and horizontal flight.

The aircraft of the invention also provides an aircraft capable of converting between vertical and horizontal flight and then back again to vertical flight while maintaining control during the conversion between vertical and horizontal flight by reducing the instability of the aircraft typically associated with such a flight conversion.

SUMMARY OF THE INVENTION

The present invention provides two embodiments of a simplified, inexpensive aircraft that is capable of taking off and landing vertically, and is also capable of performing a conversion in flight for horizontal flight of the aircraft. In the two embodiments of the aircraft power is provided by either a turbine jet engine or a propeller engine. The aircraft is basically comprised of a fuselage having fore and aft sections that are connected together for selective relative rotation of the sections about a longitudinal axis of the fuselage. A pair of opposed rotor blades are mounted on the fore fuselage section on a common lateral axis. Pitch controls are provided for selectively adjusting the pitch of each of the rotor blades to control the blades to produce lift in vertical flight as the fore fuselage section rotates relative to the aft fuselage section, and then convert the pitch of the blades to act as the fixed wings of the aircraft in horizontal flight as the fore fuselage section is gradually slowed and then locked in a stationary position relative to the aft fuselage section.

In the embodiment powered by a turbine Jet engine a portion of the engine exhaust or thrust force is channeled through the interiors of the rotor blades and out through their distal ends to exert a thrust force on the rotor blades that rotates the blades about the aircraft longitudinal axis in vertical flight and contributes to the thrust force powering the aircraft in horizontal flight when the rotor blades are fixed in position as a fixed wing. In the second embodiment powered by a propeller engine the engine is secured in the fore section of the fuselage and the engine torque causes the propeller and the rotor blades to rotate in opposite directions in vertical flight, and the propeller powers the aircraft with the rotors fixed in horizontal flight.

BRIEF DESCRIPTION OF THE DRAWINGS

Further objects and features of the present invention are revealed in the following detailed description of the preferred embodiments of the invention and in the drawing figures wherein.

DESCRIPTION OF THE PREFERRED EMBODIMENTS

FIGS. 1 through 4 show a first embodiment of the aircraft 12 of the present invention. Generally, the aircraft is constructed of first 14 and second 16 fuselage sections, with a pair of rotor blades 18, 22 projecting laterally from the first fuselage section 14 and three stabilizer wings 24, 26, 28 projecting laterally from the second fuselage section. The aircraft 12 may be constructed on a scale to carry a pilot in the second fuselage section 16 or may be constructed to a smaller scale to carry smaller payloads in the second fuselage section.

The first fuselage section 14 has a generally tubular configuration with the cylindrical exterior skin 32 of the fuselage section having conventional structural framework (not shown) in its interior providing rigidity to the fuselage section 14. The first section 14 is provided with an air intake opening 34 at its forward end and a plurality (four as shown in the drawing figures) of exhaust ports 36 spatially arranged around the external skin 32 of the fuselage. A hollow, tubular, transverse support rod 38 extends through the interior of the fuselage-first section 14 and the opposite ends of the rod project through diametrically opposite sides of the fuselage skin 32. The rod 38 is supported for rotation about its center axis 42 by a pair of bearings (not shown) supported in the fuselage first section framework (not shown) adjacent the projection of the rod ends from the fuselage external skin 32. A conventional turbine jet engine 44 is supported by the fuselage first section framework (not shown) within the interior volume of the fuselage first section. A fuel supply tank 46 is also mounted in the fuselage first section framework (not shown) within the interior volume of the fuselage first section 14. The fuel tank 46 is connected with the engine 44 in a manner known in the art to supply fuel to the engine. In the preferred embodiment the rotor blades 18, 22 which form the fixed wing in airplane mode flight are positioned at the center of gravity of the aircraft. Advantageously, the fuel tank is also positioned near the aircraft center of gravity so that the aircraft center of gravity does not change appreciably as fuel is consumed in flight. Positioned directly behind the jet engine 44 in the path of the engine exhaust or thrust force is an exhaust or thrust directing manifold 48. The manifold 48 connects with the hollow interior of the transverse rod 38 and with the fuselage exhausts 36 and directs a portion of the jet engine exhaust or thrust force through the hollow interior of the transverse rod 38, out the opposite ends 52, 54 of the rod, out through the blades, deflected ninety degrees and directed out of the tips of the blades. The remaining portion of the engine exhaust or thrust force not directed through the manifold 38 passes longitudinally beyond the manifold and is directed out the exhaust ports 36 over the exterior of the aircraft as will be explained. A control valve assembly 50 shown schematically in FIGS. 3 and 6 controls the proportions of the engine exhaust or thrust force directed through the interiors of the rotor blades or out through the fuselage exhausts. The control valve 50 can be selectively controlled to adjust the proportions of thrust force directed through the rotor blades or the fuselage exhaust. By adjusting the valve assembly 50 the proportion of thrust force directed through the rotor blades can be decreased until none of the thrust force is directed through the rotor blades and the entire thrust force is directed out of the fuselage exhaust 36 where the thrust force exhausted out of the fuselage exhaust is the sole force propelling the aircraft in flight. In one embodiment of the invention the valve assembly 50 controls the thrust force of the Jet engine so that the core air or turbine exhaust from the middle of the engine is ducted through the interiors of the rotor blades and out the rotor blade exhaust ports 106, 108 and the fan air or exhaust from the periphery of the engine is ducted back through the fuselage exhaust 36. In adjusting the control valve assembly 50, a portion or all of the turbine exhaust is channeled away from the rotor blade ducts and is exhausted with the fan air out of the fuselage exhaust 36 for higher efficiency during airplane flight mode due to less gas pressure loss than continuing to turn and duct the gas out through the blades.

Figure 4:
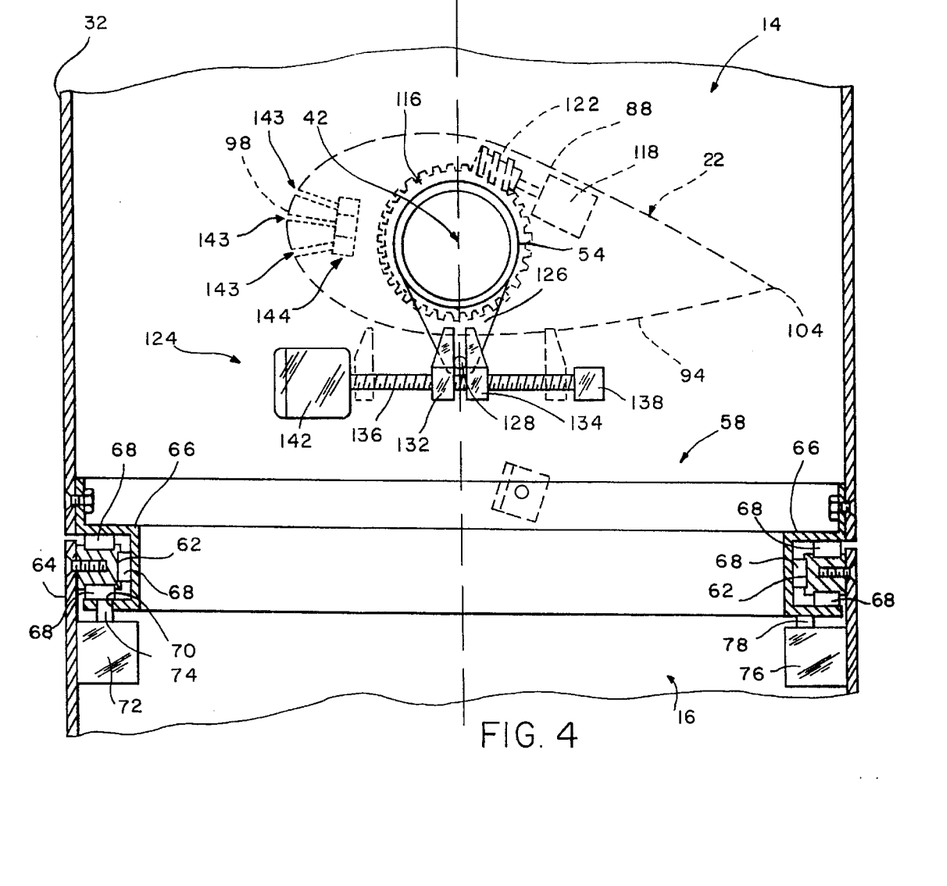
FIG. 4 is a partial view, in section, showing the bearing connection between the first and second fuselage sections of the aircraft.

The first and second fuselage sections 14, 16 are connected together for relative rotation of the sections about the longitudinal axis 56 of the aircraft by a circular bearing assembly 58. The bearing assembly 58 includes a circular race 62 secured to the interior surface of the fuselage second section 16 exterior skin 64. The race 62, like the interior framework (not shown) of the fuselage second section 16 adds structural rigidity to the second section as well as serving as a component part of the bearing assembly 58. A circular channel member 66 having a general U-shaped cross section is connected to the interior surface of the fuselage first section skin 32. As is best seen in FIG. 4, the circular race 62 is positioned within the circular channel 66 and a plurality of roller bearings 68 are provided between the race and channel to connect the first and second fuselage sections 14, 16 for relative rotation between the sections about the aircraft longitudinal axis 56. Besides providing a connection between the first and second fuselage sections 14, 16 that enables relative rotation between the sections, the bearing assembly 58 also adds to the structural rigidity of the fuselage first and second sections and enhances the rigidity of the sections provided by conventional interior framework (not shown).

At least one hole 70 is provided in a flange portion of the circular channel member 66. The hole 70 is positioned in the flange of the channel member 66 so that it opens toward the interior of the second fuselage section 16. A solenoid 72 having a selectively retracted and extended pin 74 is mounted on the interior of the fuselage second section 16 adjacent the flange of the channel member 66. Selectively extending the pin 74 from the solenoid 72 into the hole 70 provided in the channel member flange locks the first and second fuselage sections 14, 16 to each other and prevents their relative rotation about the aircraft longitudinal axis 56. Selectively retracting the pin 74 into the solenoid 72 frees the first and second fuselage sections 14, 16 for relative rotation about the longitudinal axis 56. In this manner, the solenoid 72 and the hole 70 provided in the channel member flange enable the first and second fuselage sections 14, 16 to be selectively locked against relative rotation or unlocked to permit relative rotation.

A second solenoid 76 is also mounted to the interior surface of the fuselage second section 16 adjacent the flange of the channel member 66. The second solenoid 76 also has a pin 78 that is selectively retracted and extended from the solenoid. However, the second solenoid 76 is positioned on the interior surface of the second fuselage section 16 so that when the pin 78 of the second solenoid is extended, it does not engage in the hole 70 of the channel member flange but engages against the flange to exert a friction force on the flange. When the pin 78 of the second solenoid 76 is retracted into the solenoid, it does not exert the friction force on the channel member flange. In this manner, by selectively extending the solenoid pin 78 from the solenoid 76 or retracting the pin into the solenoid, the second solenoid 76 selectively exerts a braking force braking the relative rotation between the first and second fuselage sections 14, 16 to slow the rotation between the sections facilitating insertion of the pin 74 in the locking hole 70, or exerts no braking force between the two fuselage sections permitting them to rotate freely about the aircraft longitudinal axis 56.

The pair of hollow rotor blades 18, 22 are mounted on the distal projecting ends 52, 54 of the transverse rod 38 for rotation of the blades relative to the rod and the fuselage first section 14. The rotor blades 18, 22 have respective top surfaces 86, 88, bottom surfaces 92, 94, leading edges 96, 98, and trailing edges 102, 104, all configured in a conventional manner to create lift beneath the rotor blade bottom surfaces 92, 94 when the rotor blades are rotated about the aircraft longitudinal axis 56 in a manner to be described, or when the rotor blades are pushed through the air as fixed wings in horizontal flight of the aircraft as will be explained. The hollow interiors of the rotor blades 18, 22 channel the exhaust or thrust force of the engine 44 directed through the manifold 48 out of the opposite distal ends of the transverse rod 52, 54 out through exhaust ports 106, 108 at the distal ends of the respective rotors. The exhaust ports 106, 108 are positioned on the rotor distal ends and are provided with respective channeling veins 112, 114 inside the ports to direct the exhaust or thrust force produced by the engine 44 in a direction perpendicular to the lateral axis 42 of the transverse rod 38 and to push the respective leading edges 96, 98 of the rotors through the air in either vertical flight or horizontal flight as will be explained.

As stated earlier, the transverse rod 38 is free to rotate about its lateral, center axis 42 by being mounted in the fuselage first section 14 by a pair of bearings (not shown). The rotor blades 18, 22 are mounted for rotation on the distal rod ends 52, 54, respectively, and their rotation relative to the rod ends is controlled by a positioning mechanism shown schematically in FIG. 4. Although only one mechanism is shown in FIG. 4, it should be understood that a duplicate, identical mechanism is provided for both rotor blades 18, 22 in the interiors of the blades adjacent the rod opposite ends 52, 54. The positioning mechanism consists of a spur gear 116 fixed on the exterior surface of one of the transverse rod ends, the rod end 54 is shown in FIG. 4 (or the right hand rotor blade as viewed in FIGS. 2 and 3). An electric motor 118 is fixed to the internal structure (not shown) of the rotor blade 22 and a worm gear 122 is secured to the motor output shaft and meshes with the teeth of the spur gear 116. By selective actuation of the motor 118 causing its output shaft and its worm gear 122 to rotate in opposite directions, the rotor blade 22 can be controlled to rotate in either direction over the end 54 of the transverse rod 38 thereby adjusting the pitch position of the rotor blade relative to the rod and the first fuselage section 14. In adjusting the pitch of the rotor blades they can be rotated between a first position of the blades where planes passing through the leading 96, 98 and trailing edges 102, 104 of each blade are generally perpendicular to the aircraft longitudinal axis 56 for helicopter mode flight, and a second position where the planes are generally parallel to the aircraft longitudinal axis 56 for airplane mode flight.

A load equalizing mechanism 124 is provided in the interior of the first fuselage section 14 and is operatively connected with the transverse rod 38 intermediate the rod ends inside the fuselage. The equalizing mechanism 124 includes a crank arm 126 secured stationary to the transverse rod 38. The crank arm 126 rotates with the free rotation of the transverse rod 38 and the load equalizing mechanism 124 controls the freedom of the transverse rod 38 to rotate about the lateral axis 42 of the rod. The crank arm 126 has a pin 128 at its distal end which is positioned between a pair of adjustable clamps 132, 134. The clamps 132, 134 are screw threaded on a screw thread actuator 136 that has oppositely directed screw threads at its opposite ends. The actuator 136 is mounted at one end in a journal bearing 138 and its opposite end is powered by an electric motor 142. By selective operation of the motor 142 the screw actuator 136 can be rotated in opposite directions to selectively control positioning of the clamps 132, 134 toward each other to their relative positions shown in full lines in FIG. 4, or away from each other to their relative spaced positions shown in dashed lines in FIG. 4.

As shown in FIG. 4, the rotor blades 18, 22 are mounted on the transverse rod 38 so that the center of aerodynamic forces exerted on the blades is aft or toward the trailing edges 102, 104 of the blades from the lateral axis 42 or center of rotation of the blades. As a result, aerodynamic forces are exerted on the rotor blades that urge the blades to rotate about the lateral axis 42 and point into the relative wind passing around the blades. Depending on the particular environment of the aircraft at any given time, the aerodynamic force exerted on one blade may be larger than the aerodynamic force exerted on the other blade. The load equalizing mechanism 124 is employed to equalize the aerodynamic forces exerted on the two rotor blades during the conversion from helicopter mode flight to airplane mode flight and back again to helicopter mode flight. In the first position of the clamps 132, 134 shown in full lines in FIG. 4 where they engage against opposite sides of the crank arm pin 128, the transverse rod 38 is locked against free rotation in its bearing mountings in the first fuselage section 14. With the rod 38 locked against rotation the aerodynamic forces exerted on one rotor blade may be larger than the forces exerted on the other blade. By selective operation of the motor 142 to separate the clamps 132, 134 from each other to their relative positions shown in dashed lines in FIG. 4 the crank arm pin 128 is permitted to move freely within the space between the opposed clamps and thereby enables the transverse rod 38 to rotate freely within its bearing mountings to the fuselage first section 14. This free rotation of the transverse rod 38 allows both rotor blades connected to the rod to rotate with the rod relative to the fuselage until the aerodynamic loads exerted on each of the rotor blades 18, 22 centered behind the blades' axis of rotation 42 equalize so that no greater aerodynamic load is exerted on either one of the rotor blades. Other equivalent means known in the art may be constructed within the interior of the first fuselage section 14 to equalize, automatically, the aerodynamic load exerted on the two rotor blades 18, 22.

The second, or aft, section of the fuselage 16 also has a generally tubular configuration that tapers to a point at the rearwardmost end of the aircraft. The external skin 64 of the fuselage second section is supported by an internal framework (not shown) that adds rigidity and strength to the section. In addition, the circular race 62 at the forward, open end of the second section 16 also adds some rigidity and strength to the section. The major component parts (the engine and fuel tank) of the aircraft are located in the forward, first fuselage section 14 so that the rearward, second fuselage section 16 has ample room for a payload represented schematically as 148 in FIG. 3. The payload 148 may be a pilot's compartment or may be used for other purposes if the aircraft is remotely operated as a drone. The three stabilizer wings 24, 26, 28 are secured to and extend laterally from the second fuselage section 16. Each of the wings is provided with a control surface to control the rotational position of the fuselage aft section about the longitudinal axis in helicopter flight mode. The wings 24, 26, 28 are positioned directly in the path of engine exhaust or thrust force directed out of the four exhaust ports 36 positioned around the circumference of the first fuselage section 14. In this manner, the yaw position of the aft fuselage section is controlled by the control surfaces of each of the wings by their deflecting the rotor blades' downwash and, in some embodiments, also the exhaust or thrust force of the engine exhausted over the control surfaces of the wings. Three identical landing shock absorbers 152 are secured to the distal ends of the stabilizer wings 24, 26, 28 for cushioning and absorbing the shock of vertical landings performed by the aircraft. The control connections (not shown) between the first and second fuselage sections 14, 16 that control the engine 44, its fuel supply source 46, and the pitch of the rotor blades 18, 22, are conventional connections that provide continued communication between the two fuselage sections even when the first section 14 is rotating relative to the second section 16. These conventional control connections can be provided by a mechanical swash-plate connection between the two fuselage sections or by conventional electrical slipping connections between the two sections that enable the sections to rotate relative to each other while providing constant electrical communication between the two sections.

The aircraft 12 of the invention is capable of both vertical flight in a helicopter mode and horizontal flight in an airplane mode. Each flight of the aircraft is initiated and ended with the aircraft operating in the helicopter mode as will be explained.

Figure 1:
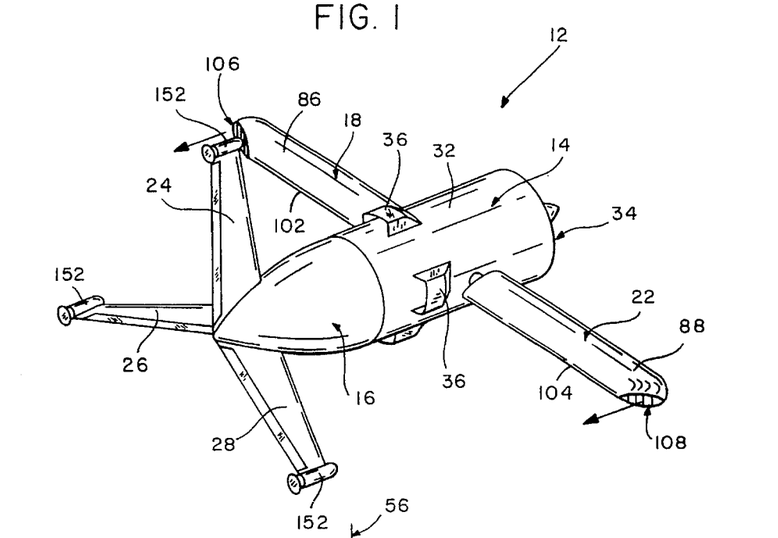
FIG. 1 is a perspective view of the aircraft of the invention in horizontal flight.
Figure 2:
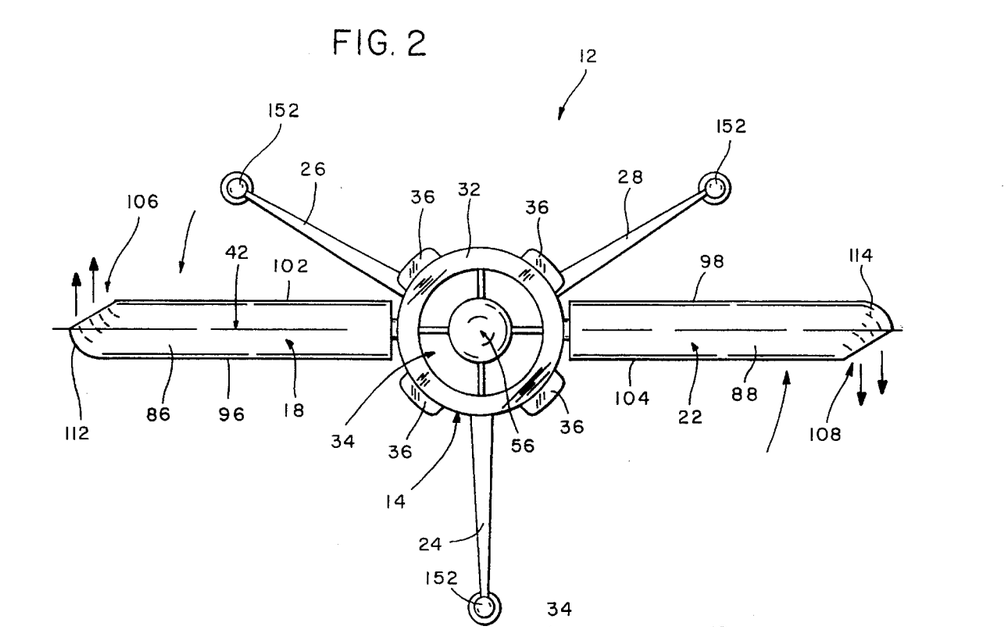
FIG. 2 is a front plan view of the aircraft of the invention in vertical flight.
Figure 3:
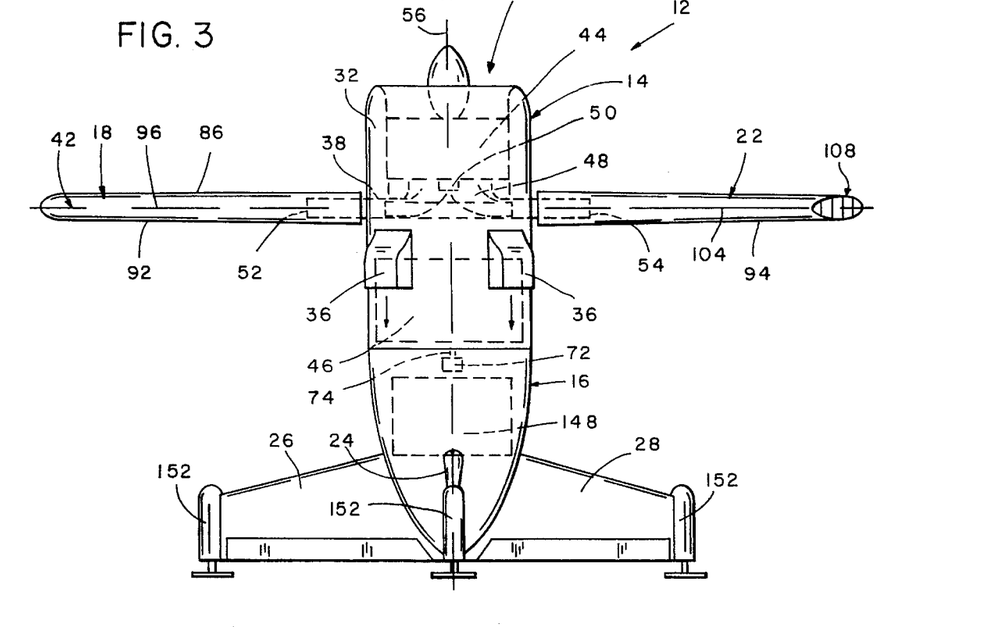
FIG. 3 is a side elevation view of the aircraft of the invention in vertical flight.

In the helicopter mode, the aircraft operates in a fairly conventional manner as those familiar with the helicopter art will recognize. The rotor blades 18, 22 are positioned relative to the fuselage first section 14 with their bottom surfaces 92, 94 directed downward as shown in FIGS. 2 and 3. With the jet engine 44 operating a portion of the engine's exhaust or thrust force is directed through the interiors of the fuselage first section and out through the exhaust ports 36 thereby exerting a lifting force on the aircraft. Additionally, a portion of the engine's exhaust or thrust force is directed through the manifold 48 out through the opposite ends 52, 54 of the transverse rod and is then channeled through the interiors of the rotor blades and exits out the rotor blade exhaust ports 106, 108. The exhaust or thrust force exiting the exhaust ports of the rotor blades 18, 22 is directed in a generally perpendicular direction from the lateral axis 42 of the blades and causes the blades, together with the entire first fuselage section 14, to rotate relative to the second fuselage section 16 about the aircraft longitudinal axis 56. The thrust force leaving the fuselage exhausts 36 can also be directed not purely aft but with a small tangential angle so that this force also contributes to the rotation of the rotor and first fuselage section 14. Although a single engine mounted in the fuselage is the preferred embodiment it should be understood that other configurations such as a twin engine design with engines in pods on either side of the main fuselage is possible. The fuselage exhaust 36 would then be on the rear of the engine pods and the fuselage intake 34 would be on the front of the engine pods. As the rotor blades and fuselage first section rotate, the collective pitch of the rotor blades is increased causing the blades to generate more lift and causing the aircraft to lift vertically or generally along the aircraft's longitudinal axis 56. The portion of the engine's exhaust or thrust force directed through the fuselage exhaust ports 36 and over the control surfaces of the stabilizer wings 24, 26, 28 enables the wings to control the fuselage aft section's yaw position and prevent the second fuselage section 16 from rotating with the first fuselage section 14 as the aircraft lifts in vertical flight. As the aircraft lifts vertically, its altitude can be adjusted by the speed of rotation and the collective pitch of the rotor blades and translational or horizontal helicopter mode flight can be controlled with adjustments to the "cyclic" pitch of the rotor blades as is done in conventional helicopters. What is meant by adjusting the "cyclic" pitch is changing the rotor blade pitch as a function of the position of the rotor blade about the plane of rotation of the rotor blades. The resulting difference in aerodynamic forces on the opposite sides of the rotor blades cause the aircraft to tilt in a particular desired direction of movement in the horizontal plane and results in the aircraft moving in that direction. Horizontal flight of the aircraft is achieved by tilting the rotor plane circumscribed by the rotation of the rotor blades with cyclic pitch controls as is done in conventional helicopters. Besides serving to prevent undesired rotation of the aft or second fuselage section 16, the control surfaces of the stabilizer wings 24, 26, 28 may be employed to rotate the second fuselage section 16 in opposite directions as desired.

Conversion from the helicopter mode or vertical flight to the airplane mode or horizontal flight is performed at a safe altitude above the ground and can be performed in several ways. Preferably, the conversion from vertical to horizontal flight is initiated with the aircraft climbing vertically and also traveling in the desired direction of horizontal flight. Using control of the cyclic pitch of the rotor blades the aircraft is turned or nosed over 90° into the desired direction of flight so that the longitudinal axis 56 of the fuselage is substantially horizontal as it would be in the airplane mode of horizontal flight. The collective pitch of the rotors is quickly increased until the rotor blades are fully feathered with the leading edge of each rotor blade pointing in the desired direction of horizontal flight. Aerodynamic forces exerted on the rotor blades rapidly stop their rotation as well as the rotation of the first fuselage section 14 about the aircraft's longitudinal axis 56. As the rotor blades are rotated in opposite directions about the lateral axis 42 of the blades, the thrust force directed from the blades exhaust ports 106, 108 is gradually directed aft and serves to provide forward thrust to accelerate the aircraft up to horizontal flight speed in the airplane mode of operation. As the relative rotational positions of the first and second fuselage sections 14, 16 are adjusted relative to each other, the solenoid 72 is actuated so that the solenoid pin 74 engages in the hole 70 provided in the flange of the channel member 66 thereby locking the first and second fuselage sections to each other and preventing their relative rotation. When the conversion to horizontal flight or airplane mode is complete, both rotor blades 18, 22 have been rotated so that their leading edge is directed along the longitudinal axis of the aircraft and they generate lift as aircraft wings instead of helicopter rotor blades.

Several methods are possible to prevent the aircraft from becoming unstable and departing out of control during conversion from vertical to horizontal flight due to inherent instabilities associated with a conventional helicopter pitch control mechanism. Each of these methods work to equalize the aerodynamic forces exerted on the rotor blades 18, 22 independent of the rotor blade rotational position in the plane of rotation. The preferred method of equalizing the forces exerted on the rotor blades is through the use of the earlier described load equalizing mechanism 124. As set forth earlier, each of the rotor blades 18, 22 are mounted on the opposite ends 52, 54, respectively, of the transverse rod coaxial to the rod lateral axis 42. The rod axis 42 is also the pitch axis of the rotor blades and as best seen in FIG. 4, is positioned in front of the blade's aerodynamic center so that if the blades are free to pivot on the opposite ends of the transverse rod 38, they will weathervane into the air flow passing around the blades to a position where equal and opposite forces are exerted on the blades. During conversion from vertical to horizontal flight, the electric motor 142 operates to rotate the actuator 136 separating the clamps 132, 134 from each other. The spacing produced between the clamps 132, 134 allows the crank pin 128 to move freely thereby enabling crank arm 126 and the transverse rod 38 to rotate freely in the bearings (not shown) mounting the rod in the first fuselage section 14. The rod 38 will rotate within the bearings until the rotor blades 18, 22 connected to the rod by their respective spur gears 116 meshing with the worm gears 122 of the blade pitch adjusting motors 118 reach equilibrium positions with equal but opposite aerodynamic forces being exerted on each of the blades. In this manner, instability of the aircraft during transition from vertical to horizontal flight is avoided.

Another approach to reducing aircraft instability during conversion from vertical to horizontal flight involves controlling rotor blade pitch with a control tab and having neutral cyclic during conversion. This system is known in the prior art and is employed on Kaman helicopters. By positioning the trim tabs of each rotor in the same position independent of the rotor blade pitch, the blades will weathervane into the air flow around the rotors until they position themselves at equal angles of attack thereby achieving balanced aerodynamic forces.

Still another approach involves providing pressure tubes in the leading edge of the rotor blades. The pressure tube arrangement is shown schematically in FIG. 4 and includes three tubes 143 each communicating with a pressure transducer 144. The tubes and pressure transducers sense the aerodynamic forces exerted on the leading edge of the rotor blades just above and below the center of the leading edge. To convert from helicopter mode to airplane mode the control system (not shown) of the aircraft activates the electric motors 118 to rotate the rotor blade leading edges 96, 98 upwardly until the lower and middle pressure transducers measure or sense the same pressure corresponding to a pre-determined rotor blade angle of attack to the relative wind passing around the blades for both rotor blades, thus equalizing the aerodynamic forces between the rotor blades. As the rotor blade revolutions per minute drop and the aircraft velocity increases along its longitudinal axis as it continues to turn to its horizontal orientation, the electric motors 118 keep turning the rotor blades with their leading edges directed upwardly to maintain equal pressure between the middle and lower transducers until the conversion is completed.

For conversion from fixed wing airplane mode flight to rotary blade helicopter mode flight the process is performed in reverse and this time the control system activates the electric motors 118 to turn the rotor blades with their leading edge down until the middle and upper pressure transducers measure equal pressures. As the rotor blades' revolutions per minute increase and the aircraft velocity along its longitudinal axis decreases as it turns to its vertical orientation, the electric motors keep turning the rotor blades with their leading edges directed downwardly to maintain equal pressures between the middle and upper transducers until the conversion is completed.

In horizontal flight of the aircraft in the airplane mode, portions of the jet engine exhaust are directed through the interiors of the rotor blades 18, 22 and out of their respective exhaust ports 106, 108. Also, a portion of the engine's exhaust and thrust force is directed out of the fuselage exhaust ports 36 to provide forward thrust and propulsion of the aircraft in horizontal flight. Roll control of the aircraft is achieved by controlling the "collective" pitch of the rotor blades 18, 22 through selective actuation of their electric motors 118 in the same manner as the blade pitch was controlled in the helicopter or vertical flight mode. By selectively increasing the lift on one rotor blade by rotating the blade so that its leading edge is moved upward, and decreasing the lift on the opposite rotor blade by rotating the blade so that its leading edge is directed downward, the roll of the aircraft about its longitudinal axis is controlled. In this manner the aircraft can be controlled to turn to the left or right as desired by decreasing the lift of the rotor blade on the side to which a turn is desired and increasing the lift of the opposite rotor blade. To control the ascent or descent of the aircraft the pitch of both of the rotor blades is simultaneously controlled to either increase or lift the leading edge of both of the rotor blades, or decrease the leading edge of both of the rotor blades, respectively. By controlling the pitch of each of the rotor blades the aircraft is controlled in horizontal flight while the stabilizer wings of the aircraft stabilize the aircraft in pitch and yaw.

Several methods of operation are also possible to convert the aircraft from horizontal flight or airplane mode to vertical flight or helicopter mode. In the preferred approach, the rotor blades are controlled to rotate together about their lateral axis 42 increasing their angle of attack or raising their leading edges, thereby increasing their lift and pulling the aircraft up into a vertical climb directing its longitudinal axis 56 generally vertically. Once the aircraft is pointing and traveling straight up with its longitudinal axis 56 positioned vertically, the load equalizing mechanism 124 is again actuated to equalize the loads on the rotor blades and to permit them to weathervane freely and the solenoid pin 74 of the solenoid 72 securing the first and second fuselage sections 14, 16 together is disengaged releasing the first and second fuselage sections from their connection together. Releasing the connection between the first and second fuselage sections enables the first section to rotate relative to the second section and the electric motor 118 of each of the rotor blades is actuated to rotate the blades about their lateral axis 42 so that their leading edges are lowered and the blade top and bottom surfaces are directed generally perpendicular to the aircraft longitudinal axis 56 causing the rotor blades to rapidly start spinning the forward or first fuselage section 14 relative to the second section. The above described conversion and rotation of the rotor blades in opposite directions causes the rate of ascent of the aircraft to slow considerably and once the aircraft has come to a complete stop, with the first fuselage section 14 rotating relative to the second section 16, the aircraft is once again established in its helicopter mode of operation in vertical flight.

It is known in the art that a turbine jet engine provides a more efficient system of propulsion for high speed flight and a propeller propulsion system provides a more efficient system for lower speeds. In a variant embodiment of the invention shown in FIG. 5 the aircraft 152 of the invention is provided with a propeller propulsion system and is otherwise substantially the same as the first described embodiment powered by a turbine jet engine. In a second embodiment of the invention shown in FIGS. 5 and 6, many of the component parts of the first described embodiment of the invention are identical and are identified by the same reference numerals employed in describing the first embodiment followed by a prime ('). For example, the entire aft section or second fuselage section 16' and its component parts are identical to the first described embodiment and therefore will not be described again with reference to the second embodiment. Likewise, the connection between the first and second fuselage sections 14', 16' is identical to that of the first embodiment of the invention.

The second embodiment differs from the first embodiment primarily in that its source of motive power is a propeller 154 driven by an engine 156 mounted in the interior of the first fuselage section 14' in place of the jet engine 44 of the first embodiment. The propeller 154 functions in substantially the same manner as the jet engine by directing a portion of its exhaust or thrust force down over the exterior of the first and second fuselage sections 14', 16' and over the control surfaces of the stabilizer wings 24', 26', 28' to provide some portion of the lifting force in vertical flight. However, the propeller engine 155 does not have a portion of its exhaust or thrust force directed through the first fuselage section 14' and the rotor blades 18', 22' as in the first embodiment but causes the fuselage section together with the rotor blades to rotate about the longitudinal axis of the aircraft 152 by the torque exerted on the fuselage section 14' by the engine. With the first fuselage section 14' unlocked or disconnected from the second fuselage section 16', the torque of the engine 155 turning the propeller 154 will exert a force on the first fuselage section 14' urging it to turn in the opposite direction of rotation of the propeller. In this manner, the propeller engine 155 not only powers the propeller 154 to cause exhaust to flow over the exterior of the fuselage and the control surfaces of the stabilizer wings 24', 26', 28', but also causes the first fuselage section 14' together with the rotor blades 18', 22' to rotate relative to the second fuselage section 16' to operate the aircraft 152 in vertical flight or the helicopter mode. Although the propeller 154 of the second embodiment is shown forward of the first fuselage section 14', in variant embodiments it could be positioned between the two fuselage sections, in a ducted aft fuselage shroud or behind both sections when employed as a pusher propeller connected to the engine through a long drive shaft.

The second solenoid 76 may also be used to stabilize the aircraft in the propeller driven embodiment yet to be described. For example, should the swirl component of the propeller wash or thrust force exert a thrust force on the stabilizer wings 24', 26', 28' tending to rotate the fuselage second section 16' with the propeller 154, the second solenoid can be selectively activated to brake the fuselage second section 16' to the counter rotating first section 14' to stop the rotation of the second section 16' due to the propeller thrust force swirl component. For example, when the aircraft is flying in the helicopter mode and is in a hover positioned a short distance above the ground or landing surface, the downwash of the propeller may be blocked by the ground and the stabilizer wings may no longer control the yaw position of the aft or second fuselage section relative to the first fuselage section. The aft section starts to rotate in the same direction as the rotation of the propeller because of the swirl velocity component of the propeller downwash. The solenoid 76 may then be selectively activated to brake the fuselage second section to the fuselage first section and thereby slow or stop the aft fuselage section from rotating in the same direction as the propeller or cause it to rotate in the opposite direction.

Figures 5, 6:
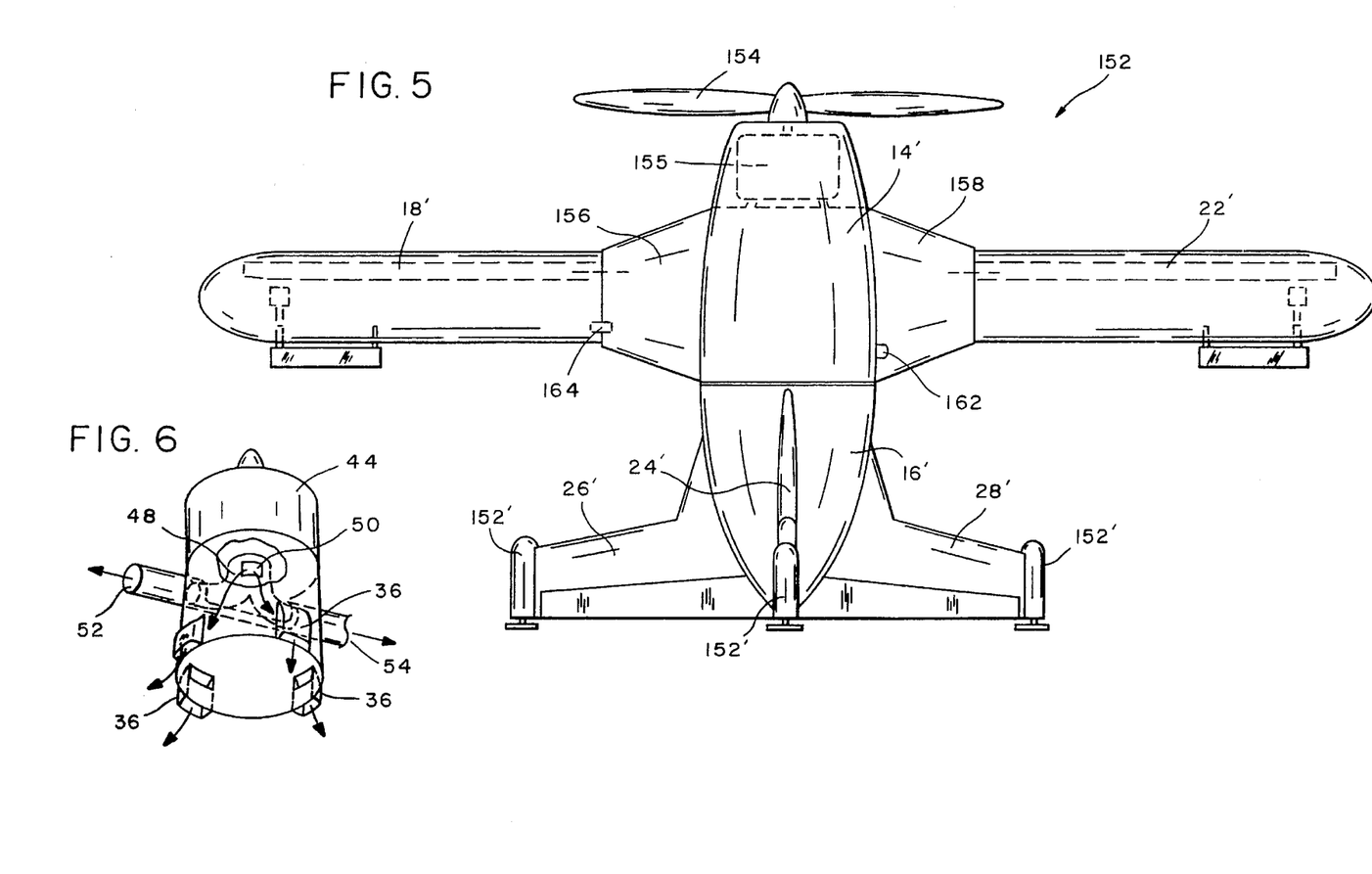
FIG. 5 is a side elevation view of a second embodiment of the aircraft.
FIG. 6 is a partial view of the exhaust ducts of the first embodiment of the aircraft.

The rotor blades 18', 22' of the embodiment of FIGS. 5 and 6 operate in substantially the same manner as the first described embodiment in vertical and horizontal flight except that they are provided with inner air foils 156, 158, respectively. The inner air foils 156, 158 are mounted on the opposite ends of the transverse rod (not shown) to rotate on the rod independent of their associated rotor blades for a limited extent of rotation of the rotor blades. This enables the air foils 156, 158 to weathervane in vertical flight and prevents the air foils from blocking the downwash or exhaust of the propeller 154 or take the swirl component out of the propeller exhaust. Like the rotor blades 18', 22', the air foils 156, 158 are mounted on the opposite ends of the transverse rod (not shown) in front of their aerodynamic centers so that they may weathervane or streamline themselves in the propeller exhaust in vertical flight. A stop block 162 provided on the right side of the fuselage first section 14' as viewed in FIG. 5 and a stop block 164 provided on the left, outer rotor blade 18' limit the weathervane free movement of the air foils 156, 158 and force the air foils to line up with their respective rotor blades 18', 22' when the pitch of the blades is controlled for positioning in horizontal flight or the airplane mode of operation. The swirl component of the propeller backwash or thrust force would tend to cause the airfoils 156, 158 to weathervane and rotate to positions in horizontal or airplane mode flight of the aircraft where the trailing edges of the airfoils are positioned slightly above the longitudinal axis of the fuselage. In these positions of the airfoils, their leading edge is directed slightly downward and they would provide little or no lift to the aircraft in airplane mode flight. To prevent the airfoils from assuming these 'no lift' positions, the stop blocks 162, 164 are provided to limit the extent at which the trailing edges of the airfoils may raise relative to the longitudinal axis of the aircraft. In converting from helicopter mode flight to airplane mode flight, the rotor blades 18', 22' rotate about their lateral axis in opposite directions relative to each other from positions where the planes of the blades are positioned substantially perpendicular to the longitudinal axis of the aircraft to where the planes of the blades are positioned substantially parallel to the aircraft longitudinal axis. In looking at the aircraft from the left hand side as viewed in FIG. 5, as the rotor blade 18' moves from its helicopter mode to airplane mode position, the blade rotates in a clockwise direction about the lateral axis of the blade and transverse rod. As the rotor blade 18' rotates, the stop block 164 eventually comes into contact with the top surface of the free, weathervaning airfoil 156 causing the airfoil to rotate about the lateral axis with the rotor blade 18'. The stop block 164 moves the airfoil 156 with the rotor blade 18' until the blade is moved to its airplane mode position where a plane passing through the blade is positioned substantially parallel to the longitudinal axis of the aircraft. With the stop block 164 engaging against the top surface of the airfoil 156, the airfoil is prevented from weathervaning to a position where the trailing edge of the airfoil is positioned above the longitudinal axis of the aircraft. In a like manner, the other rotor blade 22' rotates in a clockwise direction during conversion from helicopter to airplane mode flight when viewed from the right hand side of the aircraft shown in FIG. 5. The right hand rotor blade 22' does not have a stop block provided on the blade to engage the airfoil 158. However, the stop block 162 is provided on the right hand side of the aircraft fuselage and engages the top surface of the right hand airfoil 158 during the conversion from helicopter to airplane mode flight. The engagement of the stop block 162 against the top surface of the airfoil 158 prevents the airfoil trailing edge from weathervaning upward beyond the longitudinal axis of the aircraft. In this manner, the two stop blocks 162, 164 hold the two airfoils 156, 158 in position in airplane mode flight of the aircraft where the two airfoils also provide lift to the aircraft in airplane mode flight. Alternatively, the air foils 156, 158 can be rigidly attached to the exterior skin of the first fuselage section 14' in a streamlined position to the swirling downwash or exhaust from the propeller 154 in helicopter mode or vertical flight to avoid disrupting the direction of the downwash. Such a positioning would cause the aircraft to be less efficient in horizontal flight or the airplane mode of operation by preventing the air foils 156, 158 from aligning with their respective rotor blades 18', 22'.

While the present invention has been described by reference to specific embodiments, it should be understood that modifications and variations of the invention may be constructed without departing from the scope of the invention defined in the following claims.

What is claimed is:

1. An aircraft having a fuselage with a longitudinal axis, the aircraft being adapted for flight in a helicopter mode with the longitudinal axis oriented generally vertically and in an airplane mode with the longitudinal axis oriented generally horizontally, the aircraft comprising:

at least a pair of rotor blades, having a common lateral axis, connected to the fuselage for rotation of the rotor blades about the longitudinal axis of the fuselage;

a plurality of stabilizer wings connected to the fuselage; and, means provided on each of the stabilizer wings for supporting the aircraft when the aircraft is landed on a surface.

2. The aircraft of claim 1, wherein: said rotor blades have a common lateral axis.

3. The aircraft of claim 1, wherein:

means are provided inside the fuselage for producing a thrust force, and a plurality of exhaust ports are provided on the fuselage, and means are provided in the fuselage for directing the thrust force through the fuselage and out of the fuselage exhaust ports.

4. The aircraft of claim 1, wherein:

an air foil is mounted on the fuselage between each rotor blade and the fuselage for rotation of the air foil relative to the rotor blade about the lateral axis of the rotor blade.

5. The aircraft of claim 1, wherein:

means are provided in the fuselage for controlling the rotation of each rotor blade about its lateral axis between a first position of each rotor blade relative to the fuselage where a plane passing through both a leading and trailing edge of each rotor blade extends in a first direction generally perpendicular to the longitudinal axis of the fuselage, and a second position of each rotor blade relative to the fuselage where the plane passing through the leading and trailing edge of each rotor blade extends in a second direction generally parallel to the longitudinal axis of the fuselage; and, means are provided in the fuselage for causing the rotor blades to rotate about their lateral axes to positions where aerodynamic forces exerted on the rotor blades are equalized.

6. An aircraft having a fuselage with a longitudinal axis, the aircraft being adapted for flight in a helicopter mode with the longitudinal axis oriented generally vertically and in an airplane mode with the longitudinal axis oriented generally horizontally, the aircraft comprising:

the fuselage consisting of fore and aft coaxial sections that are connected together for relative rotation of the sections about the longitudinal axis;

at least a pair of rotor blades each having a lateral axis and each being connected to the fuselage fore section for rotation of each rotor blade about its lateral axis relative to the fuselage fore section;

a plurality of stabilizer wings connected to the fuselage aft section; and a propeller engine is secured inside the fuselage fore section and rotates a propeller outside the fuselage fore section in a first direction of rotation, and torque exerted on the propeller by the engine also generates an equal and opposite torque reaction on the fuselage fore section and causes the fuselage fore section together with the rotor blades to rotate in a second direction of rotation opposite to the first direction of rotation.

7. An aircraft having a fuselage with a longitudinal axis, the aircraft being adapted for flight in a helicopter mode with the longitudinal axis oriented generally vertically and in an airplane mode with the longitudinal axis oriented generally horizontally, the aircraft comprising:

the fuselage consisting of fore and aft coaxial sections that are connected together for relative rotation of the sections about the longitudinal axis;

at least a pair of rotor blades each having a lateral axis and each being connected to the fuselage fore section for rotation of each rotor blade about its lateral axis relative to the fuselage fore section;

a plurality of stabilizer wings connected to the fuselage aft section;

means inside the fuselage for producing a thrust force; and means inside the fore and aft fuselage sections for selectively locking the fore and aft fuselage sections together preventing their relative rotation, and for unlocking the fore and aft fuselage sections enabling their relative rotation.

8. An aircraft having a fuselage with a longitudinal axis, the aircraft being adapted for flight in a helicopter mode with the longitudinal axis oriented generally vertically and in an airplane mode with the longitudinal axis oriented generally horizontally, the aircraft comprising:

the fuselage consisting of fore and aft coaxial sections that are connected together for relative rotation of the sections about the longitudinal axis;

at least a pair of rotor blades each having a lateral axis and each being connected to the fuselage fore section for rotation of each rotor blade about its lateral axis relative to the fuselage fore section;

at least a pair of airfoils, each airfoil aligned along the same lateral axis as a rotor blade and positioned between the fuselage and a rotor blade; and a plurality of stabilizer wings connected to the fuselage aft section.

9. An aircraft having a fuselage with a longitudinal axis, the aircraft being adapted for flight in a helicopter mode with the longitudinal axis oriented generally vertically and in an airplane mode with the longitudinal axis oriented generally horizontally, the aircraft comprising;

at least a pair of rotor blades having a common lateral axis and each being connected to the fuselage for rotation of each rotor blade about its lateral axis relative to the fuselage;

means inside the fuselage for producing a thrust force; and the pair of rotor blades each have an exhaust port and one or more exhaust ports are provided on the fuselage, and means are provided in the fuselage for controllably directing the thrust force through the fuselage, through the rotor blades and out the rotor blade exhaust ports and through the fuselage and out the fuselage exhaust ports;

Said fuselage exhaust ports face downward when the vehicle is in helicopter mode.

10. The aircraft of claim 9, wherein:

proportions of the thrust force directed out of the rotor blade exhaust ports and out of the fuselage exhaust ports may be adjusted.

11. The aircraft of claim 9, wherein:

an air foil is mounted on the fuselage between each rotor blade and the fuselage.

12. The aircraft of claim 9, wherein:

means are provided in the fuselage for controlling the rotation of each rotor blade about its lateral axis between a first position of each rotor blade relative to the fuselage where a plane passing through both a leading and trailing edge of each rotor blade extends in a first direction generally perpendicular to the longitudinal axis of the fuselage, and a second position of each rotor blade relative to the fuselage where the plane passing through the leading and trailing edge of each rotor blade extends in a second direction generally parallel to the longitudinal axis of the fuselage; and, means are provided in the fuselage for causing the rotor blades to rotate about their lateral axes to positions where aerodynamics forces exerted on the rotor blades are equalized.

* * * * *